United States Patent [19]

Hasch et al.

[11] Patent Number: 5,225,669
[45] Date of Patent: Jul. 6, 1993

[54] SENSOR SYSTEM WITH ADJUSTMENT FOR AMBIENT CONDITIONS

[75] Inventors: Günter Hasch; Helmut Moser, both of Heilbroon, Fed. Rep. of Germany

[73] Assignee: Telefunken electronic GmbH, Heilbronn, Fed. Rep. of Germany

[21] Appl. No.: 772,940

[22] Filed: Oct. 8, 1991

[30] Foreign Application Priority Data

Nov. 15, 1990 [DE] Fed. Rep. of Germany ....... 4036407

[51] Int. Cl.$^5$ ............................................. H01J 40/14
[52] U.S. Cl. .............................. 250/214 AL; 307/311
[58] Field of Search ............ 250/214 AL, 214 B, 205, 250/221, 222.1, 565, 573; 307/311; 356/436

[56] References Cited

U.S. PATENT DOCUMENTS

| 4,620,141 | 10/1986 | McCumber et al. | 318/483 |
| 4,708,482 | 11/1987 | Neiheisel | 250/214 B |
| 4,786,800 | 11/1988 | Kamen | 250/222.1 |
| 4,836,682 | 6/1989 | Keenan, III | 356/445 |
| 5,008,531 | 4/1991 | Ono et al. | 250/221 |

FOREIGN PATENT DOCUMENTS

| 0191639 | 8/1986 | European Pat. Off. |
| 3124464 | 3/1982 | Fed. Rep. of Germany |
| 3203091 | 8/1983 | Fed. Rep. of Germany |
| 3314770 | 10/1984 | Fed. Rep. of Germany |
| 3409818 | 9/1985 | Fed. Rep. of Germany |
| 3538553 | 5/1987 | Fed. Rep. of Germany |
| 3619209 | 12/1987 | Fed. Rep. of Germany |
| 3715798 | 1/1988 | Fed. Rep. of Germany |
| 3722600 | 1/1988 | Fed. Rep. of Germany |
| 3627074 | 2/1988 | Fed. Rep. of Germany |
| 3825663 | 2/1989 | Fed. Rep. of Germany |
| 3825665 | 2/1989 | Fed. Rep. of Germany |
| 3733762 | 4/1989 | Fed. Rep. of Germany |
| 3842098 | 6/1989 | Fed. Rep. of Germany |
| 3806881 | 9/1989 | Fed. Rep. of Germany |
| 3926228 | 2/1990 | Fed. Rep. of Germany |
| 2227093 | 7/1990 | United Kingdom |

Primary Examiner—David C. Nelms
Assistant Examiner—K. Shami
Attorney, Agent, or Firm—Spencer, Frank & Schneider

[57] ABSTRACT

A sensor system for recording the ambient conditions of an optical sensor having a transmitter unit and a receiver unit linked by an optical gap. An electronic sensor unit is provided that predetermines a basic setting of the optical sensor independent of the ambient conditions. The electronic sensor unit contains a signal processing section with comparators for comparing a reception signal of the optical sensor with threshold values corresponding to certain ambient conditions. The electronic sensor unit recognizes and evaluates changes in the ambient conditions as a function of the comparing, and restores the basic setting of the optical sensor such that the sensor system dependably reacts to subsequent changes in the ambient conditions.

10 Claims, 3 Drawing Sheets

1

SENSOR SYSTEM WITH ADJUSTMENT FOR AMBIENT CONDITIONS

BACKGROUND OF THE INVENTION

1. Field of the Invention

The invention relates to the field of optical sensors.

2. Background Information

Optical sensors in sensor systems contain a transmitter unit and a receiver unit linked to one another via an optical distance. Changes in the ambient conditions of the sensor can lead to a change in the optical distance and hence to a variation in the reception signal that can be detected and processed by an evaluation unit of the sensor system. In motor vehicles, for example, the changes in the optical properties caused by precipitation on the windshield can be registered by a sensor system, and the windshield wipers can be actuated.

To permit dependable recording of changes in the optical properties, the sensor system must be set to a defined initial value—for example by predetermining the transmission current or by adjusting the evaluation circuit. When the sensor system is used under changed ambient conditions—in the above example of the precipitation sensor with a different windshield type being used—the sensitivity of the optical sensor must be adjusted to the changed optical properties. To do so, either the amplification of the transmitter or that of the receiver must be varied by manual adjustment. In the case of frequently changing ambient conditions, this is very expensive for series production and entails high costs, since for every intended application a correspondingly adjusted system must be provided.

SUMMARY OF THE INVENTION

The object underlying the invention is to provide an optical sensor system that can be used for all different ambient conditions without adjustment problems.

This object is attained in accordance with the invention by a sensor system for recording the ambient conditions of an optical sensor having a transmitter unit and a receiver unit linked by an optical gap. An electronic sensor unit is provided that predetermines a basic setting of the optical sensor independent of the ambient conditions. The electronic sensor unit contains a signal processing section with comparators for comparing a reception signal of the optical sensor with threshold values corresponding to certain ambient conditions. The electronic sensor unit contains means for recognizing and evaluating changes in the ambient conditions as a function of the comparing and for restoring the basic setting of the optical sensor such that the sensor system dependably reacts to subsequent changes in the ambient conditions.

Advantageous embodiments of the invention are described below.

In one embodiment, the signal processing section of the electronic sensor unit has in addition to the comparators a pulse oscillator and a first logic stage. The electronic sensor unit has a logic section having a second and third logic stage and a first and second counter used for setting the amplitude of a transmission current of a transmitter element of the transmitter unit and for evaluation, and a digital-to-analog converter is provided for predetermining the amplitude of the transmission current of the transmitter element of the transmitter unit.

In another embodiment, a fixed basic value is predetermined for the reception signal of the receiver unit for basic setting of the optical sensor independently of the ambient conditions. The digital-to-analog converter has an input connected both to the first counter and to the first logic stage, and is first set to a maximum value by the first logic stage and then reduced by the second logic stage and the first counter until the reception signal fails to attain a first threshold value determined by a first one of the comparators which is connected to an output of the receiver unit.

In another embodiment, at least a first and second of the comparators of the signal processing section have inputs connected to an output of the receiver unit, have different threshold values, and emit different output signals. The third logic stage has inputs connected to an output of the second counter and an output of the first logic stage, and registers and evaluates the absence of comparator output signals when the different threshold values are not attained by the reception signal.

In another embodiment, an evaluation unit is connected to an output of the third logic stage and triggers a reaction, depending on the comparator output signals, by way of a control unit connected to the evaluation unit. A failure by the reception signal to attain respective different comparator threshold values is variously evaluated by the evaluation unit and leads to respective different reactions by the control unit.

In a further embodiment, after failure by the reception signal to attain different comparator threshold values, the basic setting of the optical sensor is restored by the logic section. This restoring process differs depending on which respective threshold value is not attained.

In another embodiment, the second logic stage is connected to an output of the first comparator and provides an output to the first counter. The second logic stage operates the first counter to count upwards when the reception signal fails to attain a second comparator threshold value so that the amplitude of the transmission current of the transmitter element is increased by the digital-to-analog converter until the reception signal attains a first threshold value.

In another embodiment, the first logic stage is connected to the output of a third comparator and sets the digital-to-analog converter, and hence the amplitude of the transmission current of the transmitter element, to a maximum value when the reception signal fails to attain a third comparator threshold value.

In a further embodiment, the optical sensor is operated with an AC voltage signal. An output of the receiver unit is connected to the pulse oscillator which generates a periodic pulse sequence.

In yet another embodiment, the comparators supply output pulses of varying number and direction depending on the reception signal. Evaluation by the evaluation unit and the reaction of the control unit depend on the number and duration of the comparator output pulses.

In a further embodiment, the system is used as a precipitation sensor system for control of a windshield wiper system in a motor vehicle subject to differing degrees of wetting of the windshield.

The optical sensor system in accordance with the invention can be used in a single design type or with a single fixed setting of its basic sensitivity for all different ambient conditions. The sensor system is automatically adjusted for applications in various ambient conditions by predetermining a fixed value for the receiver current regardless of the ambient conditions when performing the basic setting of the sensor system. To do so, the amplitude of the transmission current is initially increased to a maximum value and then successively reduced until a threshold value determined by the basic receiver current is attained.

In the event of a change in the optical properties in the vicinity of the sensor, the optical link between the transmitter and the receiver is disturbed and the current detected by the receiver unit reduced accordingly. This is evaluated by an electronic sensor unit using further threshold value switches, and if necessary an appropriate reaction by the sensor system is triggered. When the reaction of the system has ended, the sensor is reset to its basic setting by further switching means so that it can dependably record subsequent further changes in the ambient conditions.

The optical sensor system is preferably operated in the AC voltage mode, with the electronic sensor unit generating and evaluating pulses of different length and width depending on the ambient conditions.

DETAILED DESCRIPTION OF THE PREFERRED EMBODIMENTS

Figure 1:
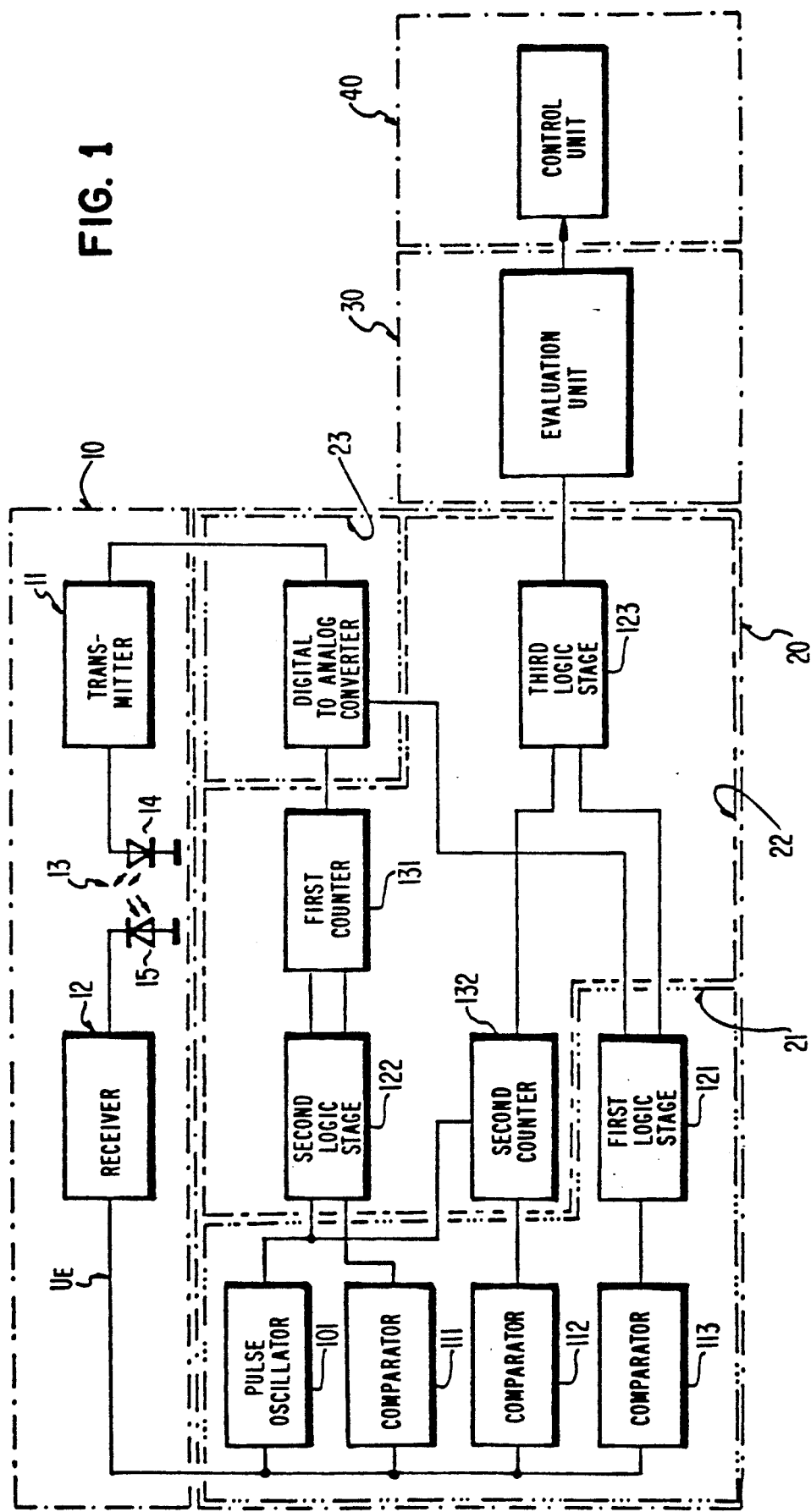
FIG. 1 shows a block diagram of an optical sensor system, FIGS. 2a and 2b the timing of the signals at various points in the circuit diagram, and FIG. 3 the layout of a digital precipitation sensor system.

According to FIG. 1, the sensor system consists of the optical sensor 10, 20, the evaluation unit 30, and the control unit 40, with the optical sensor containing the optical unit 10 and the electronic sensor unit 20.

The optical unit 10 consists of the transmitter unit 11 with a current source and transmitter element 14, the receiver unit 12 with receiver element 15 and a resonant circuit, and the optical distance 13 between the transmitter element 14 and the receiver element 15. The resonant circuit filters out of the frequency mixture emitted by the transmitter element 14 that signal corresponding to its resonance frequency; this signal is amplified and used to feed the transmitter element 14.

The electronic sensor unit 20 contains:

a signal processing section 21 with a pulse oscillator 101 that generates periodic clock pulses from the AC voltage signal, with the comparators 111, 112 and 113 used to determine threshold values during signal detection and to supply pulses of varying width depending on the set threshold value for control of the evaluation circuit, and with the first logic stage 121, which upon switch-on of the sensor system or in the event of failure to attain the lowest comparator threshold supplies an output pulse that is longer than a normal sensor pulse and that is used to control the evaluation and to set the amplitude of the transmission current, a logic section 22 for setting the amplitude of the transmission current and for evaluation of the detected signal, with a first and a second counter 131, 132 and with a second and third logic stage 122, 123 and a D/A converter 23 for controlling the amplitude of the transmission current.

The evaluation unit 30, for example a computer or microprocessor, recognizes the various pulse sequences and can trigger appropriate reactions of the control unit 40.

Figure 2A:
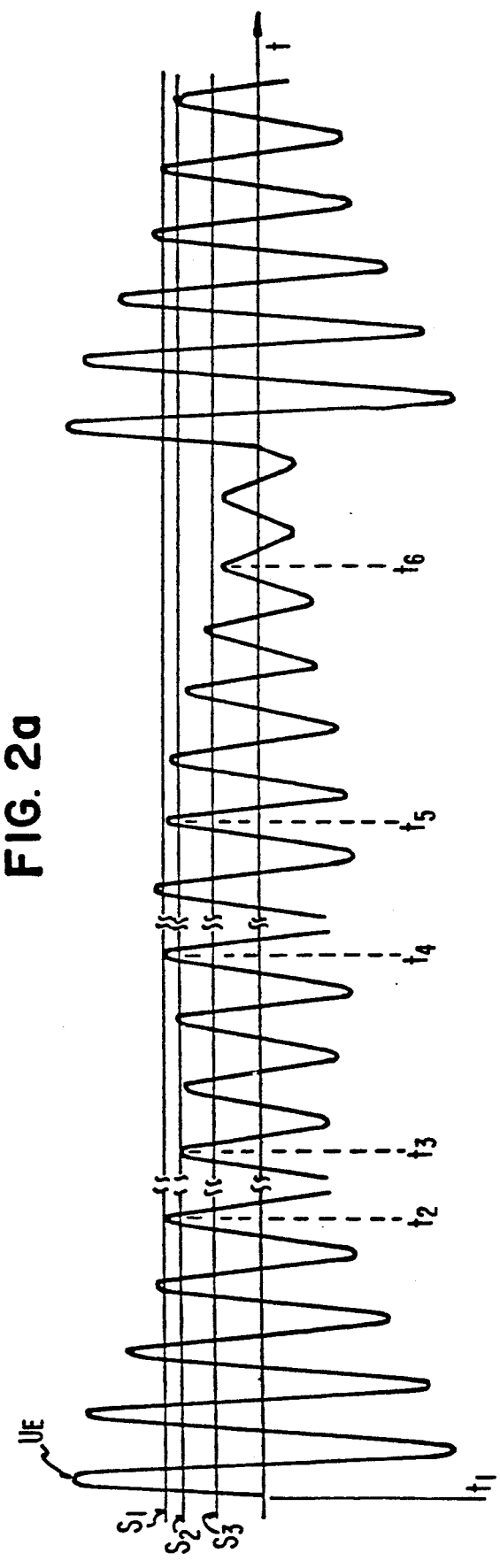
Figure 2B:
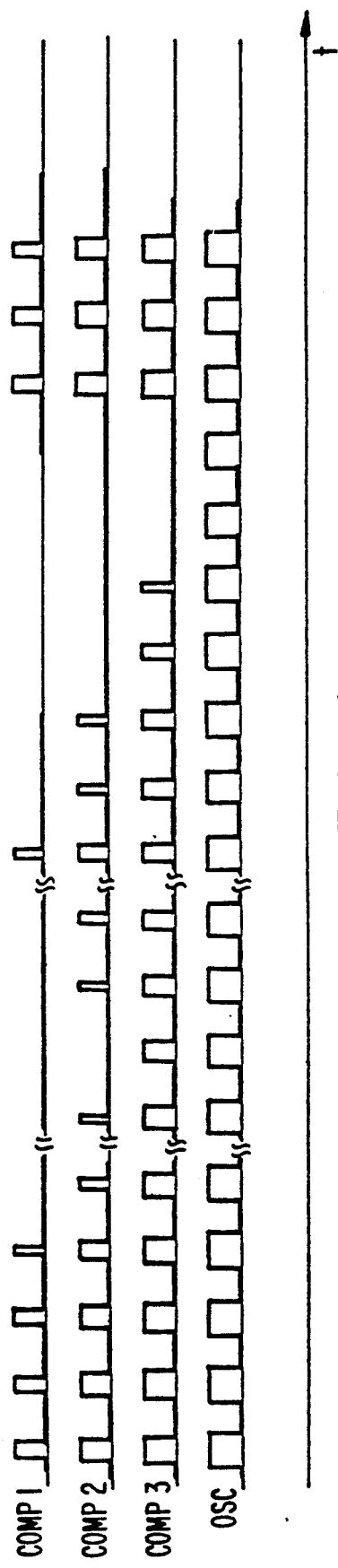

FIG. 2 shows the timing at various points of the circuit diagram according to FIG. 1; FIG. 2a shows the reception signal $U_E$ with the threshold values $S_1$, $S_2$ and $S_3$ predetermined by the comparators 111 to 113, and FIG. 2b shows from top to bottom the signals at the output of comparators 111, 112 and 113 as well as the clock signal at the output of the pulse oscillator 101.

For determination of a defined initial value or for basic setting of the sensitivity of the optical sensor, the D/A converter 23 is set to the maximum value upon switch-on of the sensor system (time $t_1$) by the first logic stage 112, so that the transmission current of the transmitter element predetermined by the value of the D/A converter 23, and hence the reception signal $U_E$ at the output of the receiver unit, assumes the maximum value (FIG. 2a) and thus exceeds the threshold value $S_1$. At the output of the comparator 111, a pulse sequence occurs (FIG. 2b) that resets step by step, the D/A converter 23 actuated by the second logic stage 122 and the first counter 131 and so reduces the amplitude of the transmission current. This procedure is maintained and thus the reception signal $U_E$ too reduced until the switching threshold $S_1$ of the first comparator 111 is attained (time $t_2$). No further pulses occur at the output of comparator 111, and the sensor is set to a fixed basic sensitivity and is ready for detection with a transmission signal at a constant level.

If the optical properties change (time $t_3$) in the vicinity of the optical sensor, the amplitude of the reception signal $U_E$ is reduced and the threshold value $S_2$ predetermined by the comparator 112 is not attained, so that no further pulses occur at the output of the comparator 112. The second counter 132, which is normally repeatedly reset by the pulses at the output of the comparator stage 112, can therefore count up when these pulses do not come; this is recognized by the third logic stage 123 and processed by the evaluation unit 30. At the same time, counting up by the counter 132 increases both the first counter 131 too, and the amplitude of the transmission signal via the D/A converter 23, until the reception signal $U_E$ has again attained the switching threshold $S_1$ and the sensor its basic setting (time $t_4$).

In the case of different degrees of change in the signals as a result of different degrees of change in the ambient conditions of the optical sensor, it is often necessary for the sensor system to react or respond differently. For this purpose, the additional comparator 113 is provided, that in the event of a major change in the reception signal $U_E$ (time $t_5$)—failure to attain comparator threshold $S_3$ at time $t_6$—no longer supplies output pulses to the first logic stage 121. This is recognized and evaluated by the evaluation unit 30, and a faster and stronger reaction by the control unit 40 to the signal change is initiated. In order to restore the sensor responsiveness immediately after this major signal change, the transmission current is—as in the switch-on procedure—increased to its maximum value by the logic stage 123 and the D/A converter 23, and then reduced, as a result of which the sensor very quickly resumes its basic setting.

Figure 3:
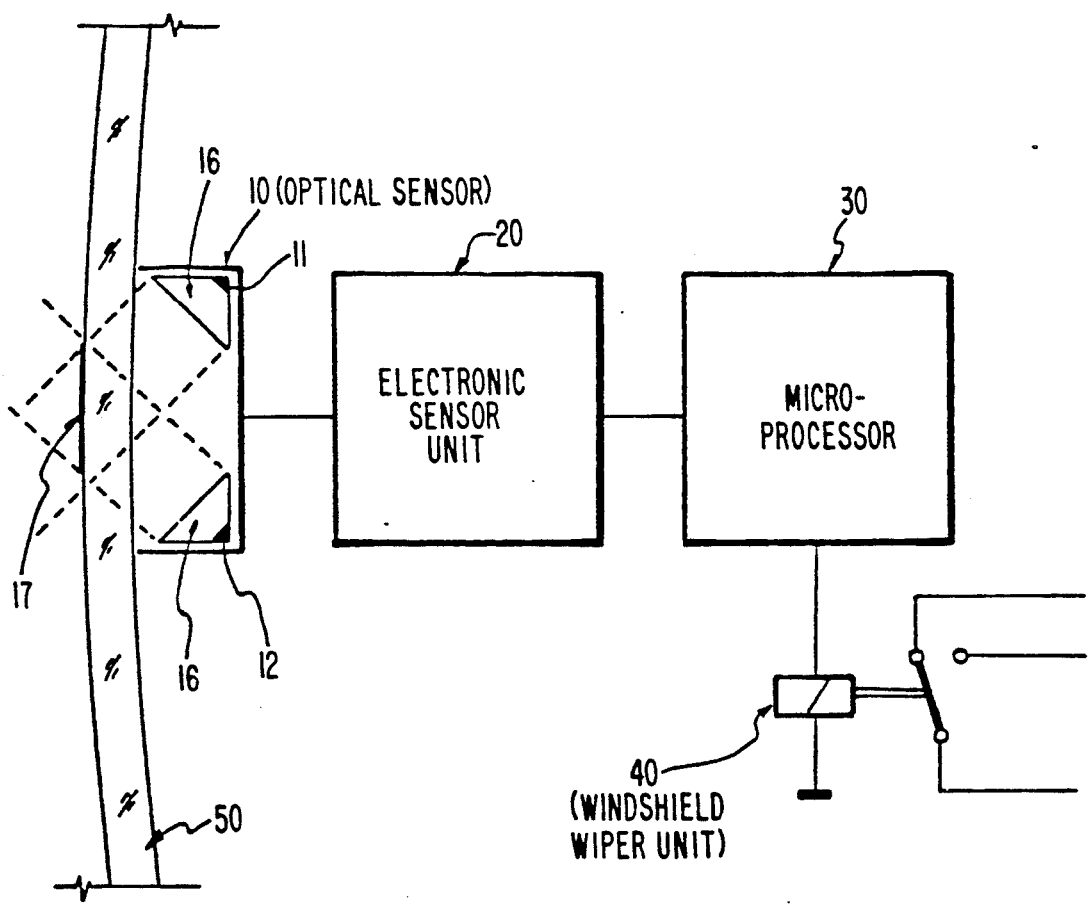

As an embodiment of a sensor system, FIG. 3 shows a precipitation sensor consisting of the optical sensor 10 operating in the infrared range, the electronic sensor unit 20, and the microprocessor 30. The precipitation sensor is intended to recognize wetting of the windshield 50 of a motor vehicle, caused by a film of moisture or by falling raindrops, for example, and to control the windshield wiper unit 40 depending on the degree of wetting or quantity of precipitation.

The precipitation sensor can be used for different windshield types 50—white glass, thermally insulating glass, anti-dazzle glass—having differing optical properties, with the windshield wiper unit 40 being controlled by the microprocessor 30 as a function of the moisture or the degree of wetness of the windshield 50—from slow interval wiping in the case of a moisture film or individual raindrops to fast continuous wiping action in the case of downpours or splash water. The precipitation sensor can be activated manually by operating a switch, which can if necessary be visually indicated; if the activated sensor does not detect any raindrops, a wiping operation can be automatically triggered after a defined and predeterminable time, for example 60 s.

The optical sensor 10 comprises, for example, an IR transmitter diode 11, a lens system 16, and an IR receiver diode 12, with the sensor being fastened to the inside of the windshield 50 and the lenses 16 being at an angle of 45° to the windshield 50. The change in the light reflected on the outside of the windshield 50 within the sensor range 17—as a result of the presence of water droplets—is picked up by the electronic sensor unit 20 and this reflection change is evaluated by the microprocessor 30. To exclude external light effects, AC voltages are used, their frequency being 50 kHz, for example. The sensor supplies an output pulse of defined width whose frequency depends on the degree of wetting or on the number of droplets recognized on the windshield.

For basic setting of the sensor 10, a fixed threshold value $S_1$—for example 700 mV—is predetermined for all different types of windshield 50. If individual raindrops hit the windshield 50, the reception signal is reduced and the comparator threshold value $S_2$ is not attained; since the comparator threshold $S_3$ is not fallen short of, slow control of the windshield wipers—for example after a settable reaction time—is predetermined. With large quantities of water on the windshield—for example splash water or persistent rain—the reception signal is reduced so much that the comparator threshold value $S_3$ is not attained. This triggers an immediate operation of the windshield wipers; subsequent initialization of the sensor by predetermination of the basic setting restores the sensor system immediately to the responsive state.

A further application of the optical sensor system is, for example, detection of bubbles or impurities in liquids. For example, impurities or gas bubbles in coloured liquids inside pipes with continuous flow quantity cause signal changes that are recognized by the sensor.

What is claimed is:

1. A sensor system for recording the ambient conditions of an optical sensor having a transmitter unit and a receiver unit linked by an optical gap,
   wherein an electronic sensor unit is provided that predetermines a basic setting of said optical sensor independent of the ambient conditions,
   wherein said electronic sensor unit contains a signal processing section with comparators for comparing a reception signal of said optical sensor with threshold values corresponding to certain ambient conditions,
   wherein said electronic sensor unit contains means for recognizing and evaluating changes in the ambient conditions as a function of the comparing and for restoring the basic setting of said optical sensor such that the sensor system dependably reacts to subsequent changes in the ambient conditions,
   wherein said signal processing section of said electronic sensor unit has in addition to said comparators a pulse oscillator and a first logic stage,
   wherein said electronic sensor unit has a logic section having a second and third logic stage and a first and second counter used for setting the amplitude of a transmission current of a transmitter element of the transmitter unit and for evaluation, and
   wherein a digital-to-analog converter is provided for predetermining the amplitude of the transmission current of the transmitter element of the transmitter unit.

2. A sensor system according to claim 1, wherein a fixed basic value is predetermined for the reception signal of said receiver unit for basic setting of said optical sensor independently of the ambient conditions, and wherein said digital-to-analog converter has an input connected both to said first counter and to said first logic stage, and is first set to a maximum value by said first logic stage and then reduced by said second logic stage and said first counter until said reception signal fails to attain a first threshold value determined by a first one of said comparators which is connected to an output of said receiver unit.

3. A sensor system according to claim 1, wherein at least a first and second of said comparators of said signal processing section have inputs connected to an output of said receiver unit, have different threshold values, and emit different output signals, and wherein the third logic stage has inputs connected to an output of said second counter and an output of said first logic stage, and registers and evaluates the absence of comparator output signals when said different threshold values are not attained by said reception signal.

4. A sensor system according to claim 3, wherein an evaluation unit is connected to an output of said third logic stage and triggers a reaction, depending on comparator output signals, by way of a control unit connected to said evaluation unit, and wherein a failure by said reception signal.to attain respective different comparator threshold values is variously evaluated by said evaluation unit and leads to respective different reactions by said control unit.

5. A sensor system according to claim 4, wherein after failure by said reception signal to attain different comparator threshold values, the basic setting of the optical sensor is restored by said logic section, and wherein the restoring process differs depending on which respective threshold value is not attained.

6. A sensor system according to claim 5, wherein the second logic stage is connected to an output of the first comparator and provides an output to the first counter, and wherein said second logic stage operates said first counter to count upwards when said reception signal fails to attain a second comparator threshold value so that the amplitude of the transmission current of the transmitter element is increased by the digital-to-analog converter until said reception signal attains a first threshold value.

7. A sensor system according to claim 5, wherein the first logic stage is connected to the output of a third comparator and sets the digital-to-analog converter, and thereby the amplitude of the transmission current of the transmitter element, to a maximum value when said reception signal fails to attain a third comparator threshold value.

8. A sensor system according to claim 4, wherein said optical sensor is operated with an AC voltage signal, and wherein an output of said receiver unit is connected to said pulse oscillator which generates a periodic pulse sequence.

9. A sensor system according to claim 8, wherein the comparators supply output pulses of varying number and duration depending on the reception signal, and wherein evaluation by the evaluation unit and the reaction of the control unit depend on the number and duration of the comparator output pulses.

10. A sensor system according to claim 1, wherein said system is used as a precipitation sensor system for control of a windshield wiper system in a motor vehicle subject to differing degrees of wetting of the windshield.

* * * * *